United States Patent Office 3,734,843
Patented May 22, 1973

3,734,843
IRRADIATION OF ETHYLENE/VINYL ACETATE COPOLYMERS
Robert K. Tubbs, Lewiston, N.Y., assignor to E. I. du Pont de Nemours and Company, Wilmington, Del.
Continuation-in-part of abandoned application Ser. No. 796,985, Feb. 6, 1969. This application Nov. 17, 1970, Ser. No. 90,456
Int. Cl. B01j 1/10, 1/12
U.S. Cl. 204—159.14                    21 Claims

ABSTRACT OF THE DISCLOSURE

The initial melt index of ethylene/vinyl acetate copolymers can be substantially, i.e., more than 50 percent, lowered by treating the copolymers with high energy ionizing radiation of high dose rates, e.g., high energy electrons. In the present process the amount of radiation employed is less than that which transforms the copolymers into elastomers as indicated by the presence of copolymer gel. Gel free irradiated ethylene/vinyl acetate copolymers containing 15–35 weight percent vinyl acetate are exceptionally useful as wax additives.

CROSS REFERENCE AND RELATED APPLICATION

This application is a continuation-in-part of my copending application Ser. No. 796,985, filed Feb. 6, 1969, now abandoned.

BACKGROUND OF THE INVENTION

The use of high energy ionizing radiation to transform normally thermoplastic materials into elastomers is well known. U.S. Patent 3,274,084 to Potts shows that ethylene/alkyl acrylate copolymers can be transformed into elastomeric, rubbery materials by exposure to electron radiation. Further, as disclosed by Bartl et al. (U.S. Patent 3,160,575) and Leeper (Canadian Patent 647,190), high energy ionizing radiation can be used to cause thermoplastic ethylene/vinyl acetate copolymers to become elastomeric in character. In particular, Bartl et al. state that elastomers can be prepared by treating ethylene/vinyl acetate copolymers containing 5–60 percent vinyl acetate with high energy ionizing rays. Thus, the preparation of high molecular weight elastomers through the use of radiation is a known technique.

However, the above-described radiation treatments as general methods of increasing molecular weight, i.e., lowering the melt index, are not uniformly acceptable; particularly where the irradiated polymer is to be used in an application where an elastomer is undesirable. For example, while many high molecular weight ethylene/vinyl acetate copolymers are very effective as wax additives, those prepared according to known radiation techniques have very limited utility as such; presumably because of their highly solvent resistant nature and consequent inability to form compatible wax blends.

SUMMARY OF THE INVENTION

A process is provided for increasing the molecular weight of ethylene/vinyl ester copolymers which, though involving the use of high energy ionizing radiation, does not result in the production of an elastomer. Accordingly, by means of the present process, high molecular weight copolymers exceptionally useful as wax additives can be prepared. The present process comprises irradiating an ethylene/vinyl ester copolymer with high energy ionizing radiation at a dose rate of at least about 1.0 mrad/min. the amount of radiation being sufficient to lower the melt index of the copolymer but insufficient to cause gel in an amount which would render the copolymer unsuitable as a wax additive.

DESCRIPTION OF THE PREFERRED EMBODIMENTS

Figure 1:
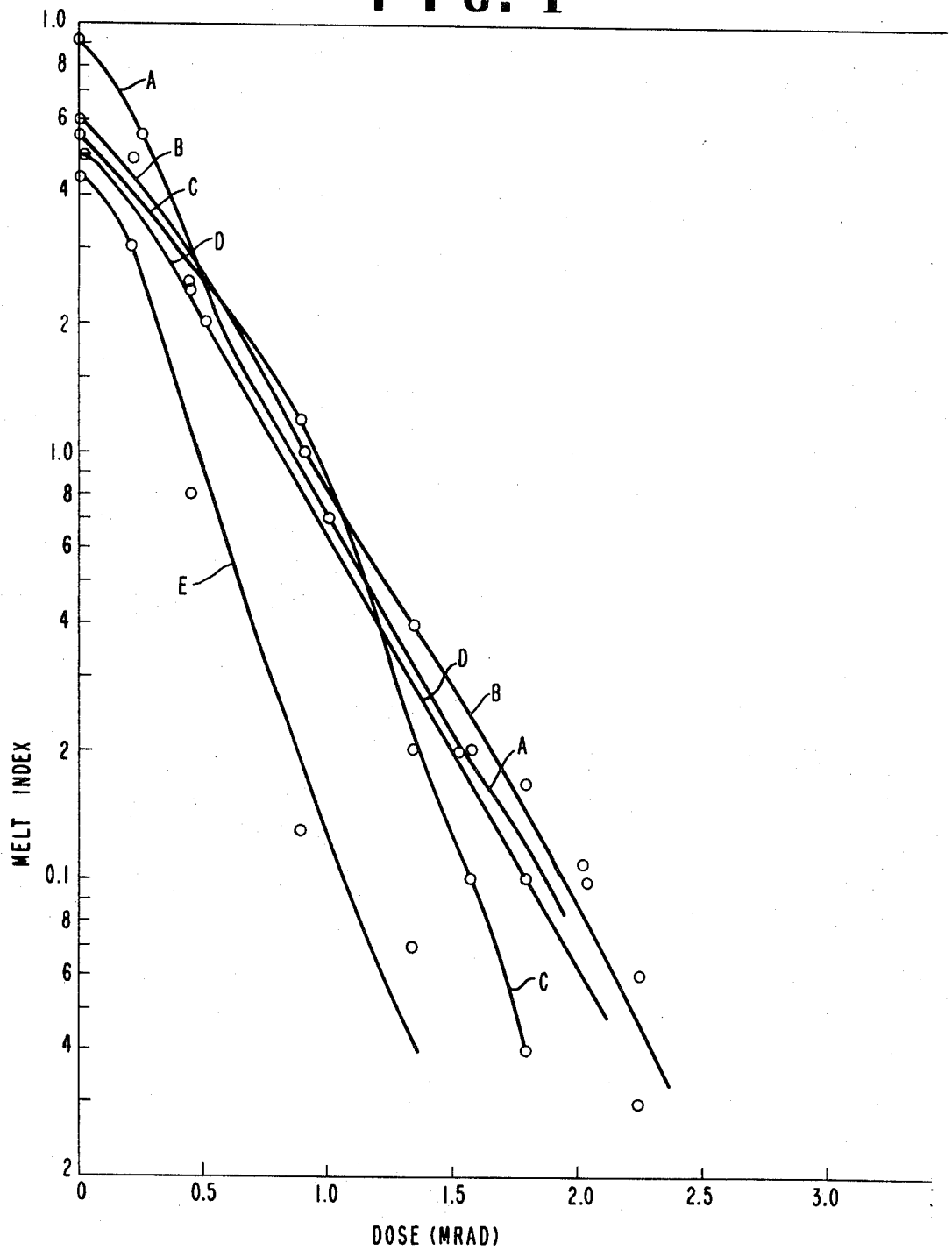
FIGS. 1 and 2 show the melt index of certain ethylene/vinyl acetate copolymers as a function of the radiation dose.

As used herein, the term vinyl ester refers to a vinyl ester of a saturated monocarboxylic acid. While vinyl acetate is the preferred vinyl ester and the invention is discussed with reference thereto, other vinyl esters are also useful in the present process. Among others, such esters include lower vinyl esters such as vinyl formate, vinyl propionate, vinyl butyrate, etc., as well as higher vinyl esters such as vinyl palmitate and vinyl stearate. Also, while the present invention is primarily illustrated with binary ethylene/vinyl ester copolymers, it is equally applicable to ethylene/vinyl ester copolymers containing minor amounts, i.e., less than about 10 weight percent, of other copolymerizable ingredients such as other vinyl compounds, e.g., vinyl chloride and styrene; other esters, e.g., acrylates and methacrylates; and unsaturated acids, e.g., acrylic and methacrylic.

Normally, ethylene/vinyl acetate copolymers are thermoplastic as indicated by their ability to flow at high temperatures, i.e., they undergo plastic flow at above about 190° C. These materials are soluble in a common organic solvent such as toluene. On transformation to an elastomer, the copolymer loses its solubility, i.e., it becomes a gel. Thus, the degree to which the copolymer is soluble in an organic solvent is a convenient indication of its elastomeric character and its associated usefulness as a wax additive. When more than about 10 percent gel is present (as measured by placing 1 gram of about ⅛″ copolymer pellets in a 100 mesh stainless steel screen basket suspended in the vapors of refluxing toluene for 24 hours and measuring the weight percent of remaining polymer), the copolymer has very limited utility as a wax additive. The preferred wax additive is a copolymer with no gel present.

The present invention involves the discoveries that there is a small but definite quantity of radiation to which an ethylene/vinyl acetate copolymer can be exposed before the copolymer is transformed into an elastomer, and that the degree of melt index reduction possible without formation of gel is dependent upon the dose rate at which the copolymer is irradiated. The maximum amount of radiation which a particular copolymer can tolerate without forming any gel is termed the critical dose. Up to the critical dose, copolymers irradiated according to the present invention have progressively lower melt indexes; the melt index at the critical dose generally being at least 50% lower than the initial melt index. Thus, by means of the present process the melt index of ethylene/vinyl acetate copolymers can be lowered by at least 50%, without adversely affecting the thermoplastic character of the copolymer.

Ethylene/vinyl acetate copolymers containing 15–35 weight percent vinyl acetate are particularly desirable wax additives and, thus, are preferred for use in the present process. However, the melt index of copolymers containing as little as 10 percent or as much as 80 percent vinyl acetate can be appreciably lowered by the present irradiation process without the formation of a deleterious amount of gel. Thus, copolymers treated according to the present process are expected to find wide utility in applications such as films and adhesives as well as in wax compositions. As used herein, the copolymer vinyl acetate content refer to the average vinyl acetate content of a batch of the bulk copolymers (usually at least several hundred pounds). The content of individual molecules or even pellets within a batch can vary widely from the average; particularly if the batch is a blend of copolymers prepared under different conditions.

The exceptional utility of the irradiated copolymers in wax is set forth in copending application Ser. No. 855,743, filed by R. E. Stahl and R. K. Tubbs on Sept. 5, 1969 and titled "Wax Blends Containing Irradiated Ethylene/Vinyl Acetate Copolymers." The disclosure contained in this application is incorporated herein by reference. As described by Stahl and Tubbs, extrudable wax blends containing irradiated ethylene/vinyl acetate copolymers possess markedly superior processing characteristics compared to similar blends containing unirradiated copolymers. Additionally, use of the present copolymers ordinarily permits one to use less copolymer in the extrudable blend. For use in extrudable wax blends, the preferred irradiated copolymers contain 15–35 weight percent vinyl acetate and have melt indexes of less than 3, preferably less than 1.5.

The initial melt index of the copolymers useful in the present invention is not especially important insofar as achieveing a melt index reduction without gel formation is concerned. As used herein, the initial melt index is the melt index which the copolymer has after direct synthesis. The method or copolymer synthesis is not important and, consequently, continuous or batch methods using tubular or autoclave reactors can be employed. The melt index of copolymers with initial melt indexes of 500 or more can be lowered by irradiation. Similarly, a melt index reduction can be caused in copolymers with initial melt indexes of below 1. However, the lowest attainable melt index without gel formation, i.e., the melt index at the critcal dose, is a function of the copolymer's initial melt index. In general, very low melt index irradiated copolymers are obtained from copolymers with low initial melt indexes. For example, when gel free copolymers with melt indexes of less than 1 are desired, copolymers with initial melt indexes of less than 10 should usually be used. As discussed hereinafter, other properties, such as vinyl acetate content and copolymer structure, can also influence the lowest attainable melt index by the present process.

While, as discussed above, the present process is especially useful with respect to copolymers with comparatively low initial melt indexes, it has broad applicability to ethylene/vinyl acetate copolymers with the previously discussed monomer contents. By means of the present process, it is possible to significantly, i.e., at least 50%, lower the melt index of a copolymer by a means which does not involve altering the polymerization conditions, e.g., temperature, pressure, conversion, etc. Thus, a spectrum of thermoplastic copolymers with different melt indexes can be prepared from a single batch of copolymer prepared under constant polymerization conditions.

In addition to initial melt index, the lowest attainable melt index at the critical dose is a function of vinyl acetate content and copolymer structure, i.e., the degree of hydrolyzable branching. For comparable initial melt indexes, copolymers with lower vinyl acetate contents can be reduced to lower gel free melt indexes than can copolymers with higher vinyl acetate contents. With respect to structure, it has been found that copolymers with low hydrolyzable branching can be reduced to a lower gel free melt index then copolymers similar in vinyl acetate content and initial melt index but with higher quantities of branching.

Hydrolyzable branching in an ethylene/vinyl acetate copolymer can be illustrated by the following structure:

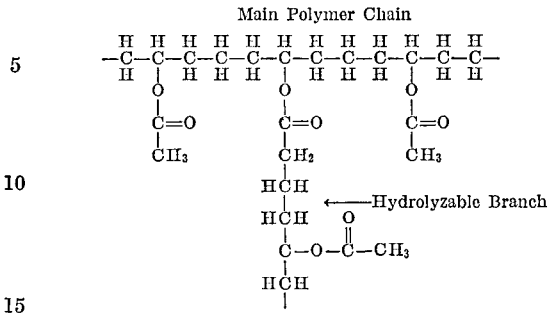

An indication of the quantity of hydrolyzable branching present in a particular copolymer can be obtained from the ratio of the melt index of the precursor copolymer ($MI_p$) to the melt index of the copolymer after substantially complete hydrolysis ($MI_H$). Hydrolysis is accomplished in methanol using a sodium methoxide catalyst. After hydrolysis, any remaining base in the copolymer is neutralized with acetic acid and the copolymer dried for 24 hours at 80° C. before the melt index is determined. For copolymers with vinyl acetate contents of less than 30 weight percent, a ratio in excess of 1 usually indicates that the hydrolyzable branching is low. Above 30 percent, progressively higher ratios are associated with copolymers containing low branching. For example, slightly branched 40 percent vinyl acetate copolymers have ratios above 1.5. To a large extent, the degree to which a copolymer is hydrolyzably branched is a function of the polymerization conditions under which it was prepared. Since the commercially available ethylene/vinyl acetate copolymers are made by different processes, copolymers with similar monomer contents and melt indexes will generally have different degrees of branching. However, any of the commercially available thermoplastic ethylene/vinyl acetate copolymers are useful in the present invention.

As discussed in Canadian Patent 797,812 the irradiation of alpha-olefin polymers is affected by the presence of antioxidant. Such is also true in the present process. The presence of an antioxidant such as butylated hydroxytoluene affects the irradiation of ethylene/vinyl acetate copolymers in two respects; first, a greater dose of radiation is necessary to accomplish a given melt index reduction and, second, the melt index at the critical dose of a copolymer containing antioxidant is higher than that of a similar copolymer containing no antioxidant. In view of these effects, it should be evident that the present process is most efficient when copolymers containing no antioxidant are used. However, when antioxidant is intimately mixed with an ethylene/vinyl acetate copolymer, its effects on irradiation are seen at a concentration of about 0.01 percent, based on the copolymer weight, and become increasingly evident as the concentration of antixodant is increased.

The quantity of radiation, i.e., dose, employed in the present process depends on the magnitude of the melt index reduction which is desired. However, even for copolymers with very high initial melt indexes, e.g., 100–500, the critical dose will generally be less than 10 megarad. As the initial melt index becomes lower, progressively less radiation is tolerable. At initial melt indexes of less than 50, a dose of 5 megarad or more will cause significant gel. At initial melt indexes of 10 or less, critical doses rarely exceed 2 megarad. The critical dose for any copolymer can be experimentally established by subjecting a sample of the copolymer to progressively increasing doses of radiation and concurrently measuring the irradiated copolymer's gel content.

The rate at which the copolymer is irradiated is particularly important. Surprisingly it has been found that it is possible to obtain gel-free products of lower melt index by irradiation at high dose rates than by irradiation at low dose rates in spite of the fact that the total dosage of irradiation is the same. Although this effect is gradual over the entire dose rate range, for practical purposes a dose rate in excess of about 1.0 mrad/min. would be employed. Preferably dose rates from about 3.0 mrad/min. should be employed. The higher the dose rate the lower the melt index which can be obtained at the same level of gel content. Accordingly there is no upper limit on the suitable dose rates for the present invention. The only restrictions result from the limitations of currently available equipment which can produce dose rates up to about 3000 mrad/min. Preferably the irradiation process should be carried out at dose rates between about 3.0 mrad/min. and about 2000 mrad/min.

Any source of high energy ionizing radiation, such as high energy electrons, neutrons, protons, and deuterons as well as X-rays, beta-rays, and gamma-rays is useful in the present process. However, in light of the above-mentioned dose rate effect, it is preferred to choose a source capable of high dose rates (for example, high energy electrons are preferred over Co-60 gamma-rays on this basis). Regardless of the source, useful radiation must be sufficiently energetic to penetrate the copolymer and cause ionization therein. Radiation naturally emitted from a radioactive source has sufficient energy to be useful herein. When accelerated particles are used, e.g., electrons, potentials of greater than 0.5 mev. are satisfactory for small pellets and thin films.

The copolymer form and irradiation temperature are not especially critical. The copolymer should be in a form such that it can be uniformly irradiated and consequently small (less than ½" diameter) pellets or thin films are preferred. Regarding temperature, similar radiation effects have been observed on copolymers irradiated at 25° C. and 80° C. For convenience, irradiation at ambient temperature is preferred.

Examples 1–13

The attached drawings illustrate the irradiation process of the present invention with respect to a variety of ethylene/vinyl acetate copolymers. The copolymers, in the form of ⅛" pellets, were irradiated under atmospheric conditions and at ambient temperature with high energy electrons using a 2 mev. General Electric resonant transformer at 0.3 milliamp (dose rate, 3.0 mrad/min.). Dose was controlled by the amount of time the copolymers were subjected to radiation. Percent gel was established in the manner previously discussed; the basket being suspended in a 2 gallon vessel containing 2 pints of toluene. Melt index was measured according to ASTM D–1238–57T using Condition E. Prior to determining the melt indexed reported herein, the copolymers were dusted with 500–1000 p.p.m. butylated hydroxytoluene (BHT).

The letters represent the following ethylene/vinyl acetate copolymers:

| Letter | Example | Vinyl acetate (wt. percent) | Initial melt index | $MI_P/MI_H$ | Antioxidant (BHT) during irradiation [1] |
|---|---|---|---|---|---|
| A | 1 | 28 | 9 | .9 | No. |
| B | 2 | 28 | 6 | 1.6 | Yes. |
| C | 3 | [2] 28 | 5.5 | 1.7 | Yes. |
| D | 4 | 28 | 5 | 1.4 | Yes. |
| E | 5 | 28 | 4.4 | 1.6 | No. |
| F | 6 | 25 | 400 | 1.4 | Yes. |
| G | 7 | 18 | 150 | 1.2 | Yes. |
| H | 8 | 28 | 170 | 1.3 | No. |
| I | 9 | 40 | 77 | 1.6 | Yes. |
| J | 10 | 33 | 33 | 1.1 | No. |
| K | 11 | 40 | 6 | .8 | |
| L | 12 | 18 | 2.5 | 1.2 | Yes. |
| M | 13 | 25 | 2 | 1.5 | Yes. |
| N | | 33 | 50 | 1.8 | No. |
| O | | 40 | 52 | | Yes. |
| P | | 28 | 5.5 | | No. |

[1] When present, quantity is 500–1000 p.p.m. except for D which has about 200 p.p.m.
[2] Copolymer also contains about 1 percent methacrylic acid.

Figure 2:
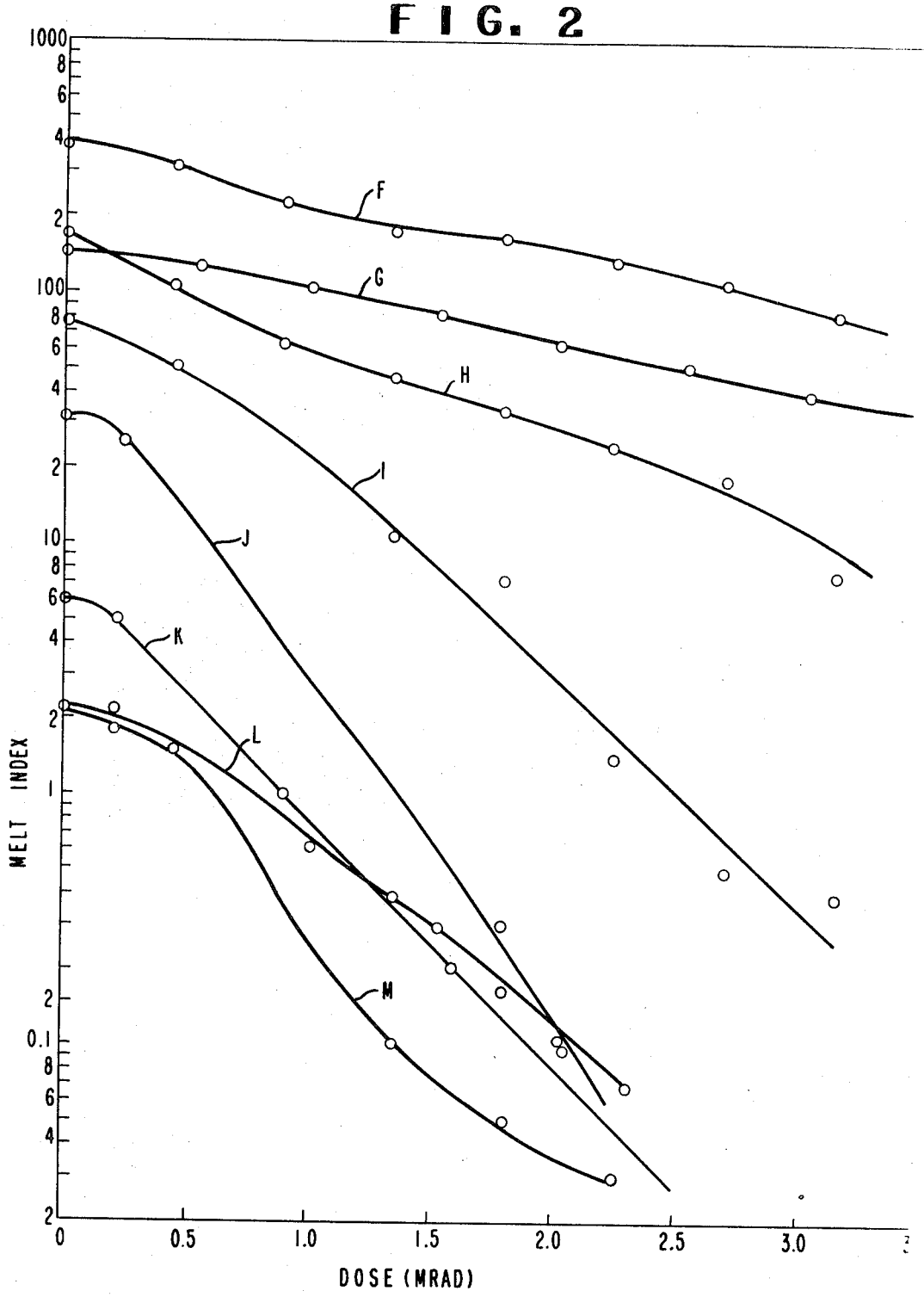
Figure 3:
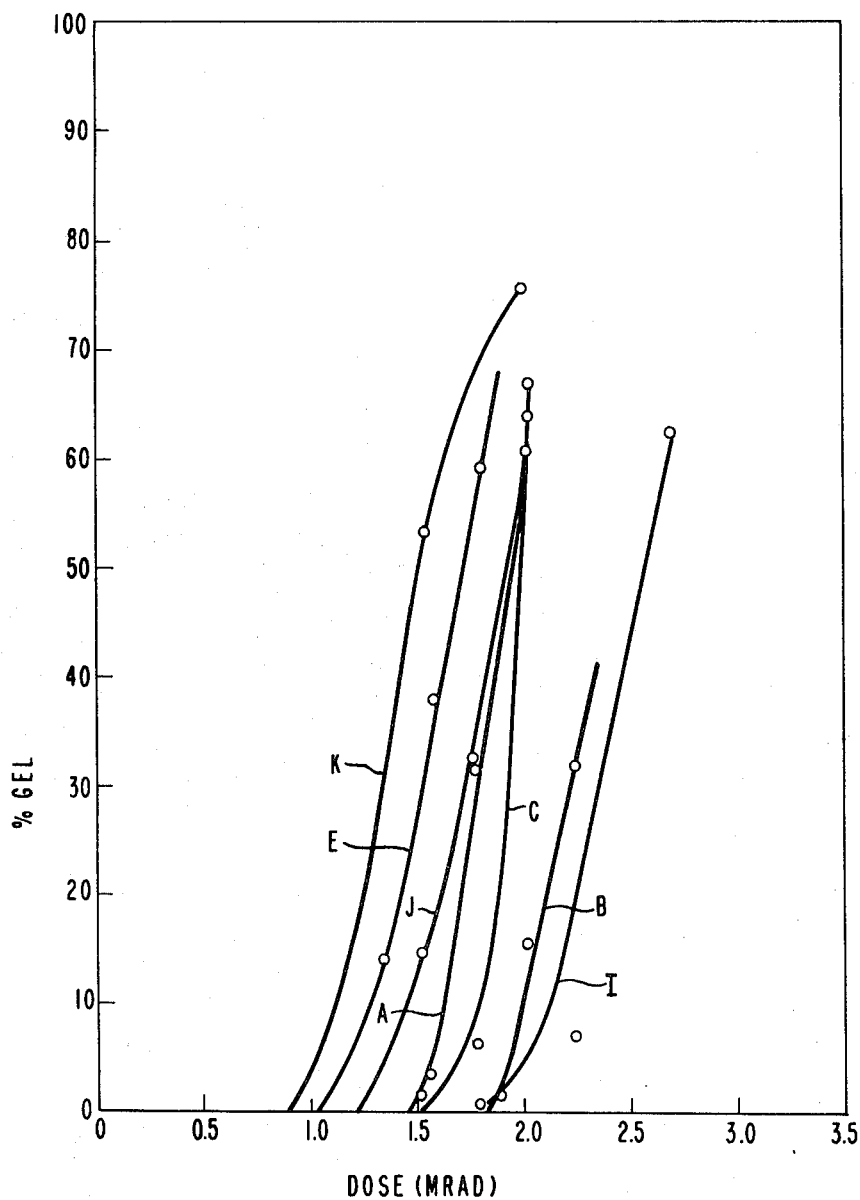
FIG. 3 shows gel content of the copolymers of FIGS. 1 and 2 at various doses.

Referring to the drawings, FIGS. 1 and 2 illustrate the progressive decrease in copolymer melt index as the radiation dose is increased. FIG. 3 illustrates the fact that there is a critical amount of radiation which, if exceeded, will result in gelled copolymers. Therein, it is shown that an increase in dose above the critical limit of as little as about 0.5 mrad can result in significant copolymer gelling.

The melt indexes of the copolymers referred to in FIG. 3 at the critical dose are as follows:

| Copolymers: | Melt index at critical dose |
|---|---|
| A | 0.3 |
| B | 0.2 |
| C | 0.1 |
| E | 0.1 |
| I | 10 |
| J | 1 |
| K | 2 |

The copolymers referred to in FIGS. 1 and 2 which are not shown in FIG. 3 had critical doses in excess of 1.8 megarad. These copolymers were gel free at the following doses:

| Copolymers | Dose | Melt index at dose |
|---|---|---|
| D | 2.0 | 0.10 |
| F | 3.2 | 83 |
| G | 3.6 | 35 |
| H | 3.2 | 8 |
| L | 2.3 | 0.06 |
| M | 2.0 | <0.06 |

The molecular weight distribution of copolymer E irradiated to 0.5 and 0.1 MI was investigated by solvent-nonsolvent (toluene-acetone) extraction fractionation. In both cases the distribution was found to be distinctly bimodal with the high molecular weight peak essentially double the molecular weight of the low molecular weight peak. It is believed that the high molecular weight fraction consists of branched, cross-linked molecules, and it is this fraction which provides the unique properties of the irradiated copolymers.

Examples 14–17

Samples of copolymers B, P, H, and J were irradiated with Co-60 gamma-rays to various doses at dose rates of 0.0048 or 0.0160 mrad/min. Melt index and gel content of these samples were determined. In all cases it was found that the melt index at the critical dose was higher for the Co-60 irradiated samples than for the electron irradiated samples. In other words, it is possible to obtain a gel-free product of lower melt index by electron irradiation at 3 mrad/min. than by Co-60 gamma-irradiation at 0.016 mrad/min.

| Copolymer | Example | Electron irradiation | | Co-60 gamma-irradiation | |
|---|---|---|---|---|---|
| | | Melt index at critical dose | Dose rate, mrad/min. | Melt index at critical dose | Dose rate, mrad/min. |
| B | 14 | 0.2 | 3.0 | 0.5 | 0.0160 |
| P | 15 | 0.1 | 3.0 | 1.0 | 0.0048 |
| H | 16 | 5.0 | 3.0 | 16.0 | 0.0048 |
| J | 17 | 1.0 | 3.0 | 7.0 | 0.0160 |

It was also noted that the pellets irradiated with Co-60 when melted in a melt indexer at 190° C. did not melt together into a homogeneous mass, but rather retained pellet identity, and even the resin extruded through the 0.082 inch orifice returned to the shape of the original 0.125 inch pellets. The samples irradiated with electrons all melted into a homogeneous mass in the melt indexer.

Examples 18–21

To further investigate the unexpected behavior demonstrated in Examples 14–17, copolymers B, P, N, and O were all irradiated to doses beyond their critical dose at dose rates ranging from 0.05 to 30.0 mrad/min. using a 2 mev. resonant transformer. Gel content of these samples was determined.

| Example | 18 | 19 | 20 | 21 |
|---|---|---|---|---|
| Copolymer | B | P | N | O |
| Total dose (mrad) | 1.9 | 1.33 | 1.33 | 2.17 |
| Dose rate (mrad./min.): | Percent gel | | | |
| 0.05 | 10 | 39 | 36 | 32 |
| 0.10 | 11 | 39 | | |
| 0.15 | 3 | | | |
| 0.25 | 2 | 44 | | |
| 0.50 | 4 | 25 | 33 | 21 |
| 1.00 | 7 | 7 | | 3 |
| 1.25 | 1 | | | |
| 1.5 | 3 | | | |
| 3.0 | | 1 | | 4 |
| 5.0 | | 8 | 3 | 4 |
| 10.0 | | 12 | | 1 |
| 30.0 | | 0 | 1 | 0 |

Allowing for the expected experimental error in measurements of this type, these data clearly show that less gel is formed at high dose rates than at low dose rates (approaching the low dose rates used with Co-60 irradiation in Examples 14–17). Again it was noted that the samples irradiated at low dose rates did not melt together at 190° C., whereas the samples irradiated at high dose rates did so.

Examples 22–23

Copolymers P and N were chosen for more careful examination near the gel point. Samples of each resin were irradiated to doses slightly above and below the critical dose at dose rates of 0.05, 0.5 and 5.0 mrad/min. with a 2 mev. resonant transformer. Melt index and gel content of these samples were determined.

| Example | Copolymer | Dose rate, mrad/min. | | |
|---|---|---|---|---|
| | | 0.05 | 0.50 | 5.0 |
| | | Melt index at critical dose | | |
| 22 | P | 0.12 | 0.10 | 0.05 |
| 23 | N | 4.0 | 2.0 | 1.0 |

Again it is seen that it is possible to obtain a gel-free product of lower melt index by irradiation at high dose rates than by irradiation at low dose rates. It was also noted that the samples irradiated at 0.05 mrad/min. did not melt together at 190° C., whereas the samples irradiated at 5.0 mrad/min. did so.

The lack of elastic recovery properties of the irradiated copolymers of the present invention further indicates their thermoplastic character. As discussed in both Bartl (U.S. 3,160,575) and Leeper (Canadian 647,190), elastomers are characterized by improved extensibility and low permanent elongation. An increasing ratio of breaking elongation ($E_B$) to permanent elongation ($E_P$) at break is associated with an increasingly elastomeric copolymer. With respect to the present copolymers, there is, at most, only a slight, i.e., less than 25%, increase in the ratio $E_B/E_P$; indicating that the copolymers remain quite thermoplastic. For example, the ratio $E_B/E_P$ for unirradiated copolymer B is about 1.8. After irradiation to about the critical dose, the ratio is found to be virtually unchanged. Similar behavior is seen with copolymer J; the $E_B/E_P$ ratio of about 2.5 remaining quite constant on irradiation to the critical dose. With respect to copolymer I, an increase in ratio of about 18% (4.25 to 5) is observed on irradiation to the critical dose. The above behavior can be compared with that of the copolymers irradiated by Leeper. In Table 1 (page 11) Leeper reports the ultimate elongation and permanent set as a function of radiation dose for a copolymer containing 46 percent vinyl acetate. Permanent elongation is calculated as the permant set times the ultimate elongation. Leeper's unirradiated copolymer has an $E_B/E_P$ ratio of 5.2. On irradiation to 1 megarad ($10^6$ roentgens), the ratio increases to 7.9, a 52% increase. On irradiation to 5 megarads, the ratio has increased 117% to 11.3. Irradiation to 20 megarads results in a 170% ratio increase to 14.

In addition to utility for applications such as wax additives, films, and adhesives, the copolymers prepared by the present process can be hydrolyzed, either partially or completely, to the corresponding ethylene copolymer containing vinyl alcohol units. Such hydrolyzed copolymers have a variety of applications, including use as adhesives and fibers. While, most unirradiated copolymers turn progressively more yellow as hydrolysis proceeds to higher degrees, quite surprisingly such is not so on the hydrolysis of irradiated copolymers. At most, only a very slight yellowing occurs with the irradiated copolymers. The fact the present copolymers do not yellow on hydrolysis makes their appearance more desirable and enhances their marketability. No special technique is necessary in order to hydrolyze the irradiated copolymers and, accordingly, any of the well-known hydrolysis methods can be used.

What is claimed is:

1. An improved process of reducing the melt index of ethylene/vinyl ester copolymers containing 10–80 weight percent vinyl ester with high energy ionizing radiation, the amount of radiation being sufficient to lower the initial melt index of the copolymer at least 50 percent but insufficient to cause more than 10 percent gel, wherein the improvement comprises accomplishing said melt index reduction at a dose rate of at least about 1.0 mrad/min. to obtain gel free copolymers having lower melt indexes than those obtainable by irradiation at a lower dose rate.

2. The process of claim 1 wherein the vinyl ester is vinyl acetate.

3. The process of claim 2 wherein the irradiated ethylene/vinyl acetate copolymer contains substantially no gel.

4. The process of claim 3 wherein the ethylene/vinyl acetate copolymer contains more than about 15 and not more than about 35 weight percent vinyl acetate.

5. The process of claim 4 wherein the initial copolymer melt index is 1–10.

6. The process of claim 5 wherein the initial melt index of the copolymer is lowered to below 1.

7. The process of claim 6 wherein substantially no antioxidant is present during irradiation.

8. The process of claim 7 wherein the high energy ionizing radiation is high energy electrons.

9. The process of claim 1 wherein the copolymer is in the form of small pellets.

10. The process of claim 9 wherein the vinyl ester is vinyl acetate and the irradiated copolymer contains substantially no gel.

11. The process of claim 10 wherein the copolymer contains 15–35 weight percent vinyl acetate.

12. The process of claim 11 wherein the initial copolymer melt index is 1–10.

13. The process of claim 12 wherein the initial melt index of the copolymer is lowered to below 1.

14. The process of claim 1 wherein the dose rate is between about 3 mrad/min. and about 2000 mrad/min.

15. The process of claim 14 wherein the vinyl ester is vinyl acetate and the irradiated copolymer contains substantially no gel.

16. The process of claim 15 wherein the copolymer contains 15–35 weight percent vinyl acetate.

17. The process of claim 16 wherein the initial copolymer melt index is 1–10.

18. The process of claim 17 wherein the initial melt index of the copolymer is lowered to below 1.

19. The process of claim 3 wherein the ratio of breaking elongation to permanent elongation of the copolymer is increased less than 25 percent on irradiation.

20. Ethylene/vinyl ester copolymers prepared by the process of claim 1.

21. Ethylene/vinyl ester copolymers prepared by the process of claim 12.

References Cited

UNITED STATES PATENTS

| 3,274,086 | 9/1966 | Potts | 204—159.14 |
| 3,160,575 | 12/1964 | Bartl et al. | 204—159.14 |
| 3,530,084 | 9/1970 | Potts | 260—28.5 |

MURRAY TILLMAN, Primary Examiner

R. B. TURER, Assistant Examiner

U.S. Cl. X.R.

260—28.5